United States Patent
Sachdeva et al.

(10) Patent No.: US 8,031,495 B2
(45) Date of Patent: Oct. 4, 2011

(54) PREDICTION SCHEME FOR STEP WAVE POWER CONVERTER AND INDUCTIVE INVERTER TOPOLOGY

(75) Inventors: Rishi Sachdeva, Calgary (CA); Russell Jack Morash, Calgary (CA)

(73) Assignee: Sustainable Energy Technologies, Alberta (CA)

( * ) Notice: Subject to any disclaimer, the term of this patent is extended or adjusted under 35 U.S.C. 154(b) by 442 days.

(21) Appl. No.: 12/133,345

(22) Filed: Jun. 4, 2008

(65) Prior Publication Data

US 2008/0298104 A1  Dec. 4, 2008

Related U.S. Application Data (60) Provisional application No. 60/941,939, filed on Jun. 4, 2007, provisional application No. 60/943,818, filed on Jun. 13, 2007.

(51) Int. Cl.
*H02M 7/5387* (2007.01)
*H02M 3/24* (2006.01)

(52) U.S. Cl. .......................... 363/71; 363/132

(58) Field of Classification Search .............. 363/16, 363/17, 65, 71, 97, 98, 56.01, 56.02, 131, 363/132

See application file for complete search history.

(56) References Cited

U.S. PATENT DOCUMENTS

| | | |
|---|---|---|
| 3,491,282 A | 1/1970 | Heinrich |
| 3,581,212 A | 5/1971 | McMurray |
| 3,628,123 A | 12/1971 | Rosa et al. |
| 3,648,149 A | 3/1972 | Brown et al. |
| 3,792,286 A | 2/1974 | Meier |
| 3,793,578 A | 2/1974 | Rettig |
| 4,032,832 A | 6/1977 | Miller |
| 4,159,513 A | 6/1979 | Gemp |
| 4,202,933 A | 5/1980 | Reiser et al. |
| 4,330,367 A | 5/1982 | Musick |

(Continued)

FOREIGN PATENT DOCUMENTS

CA  2658087  6/2001

(Continued)

OTHER PUBLICATIONS

A.M.A. Mahmound, H.M. Mashaly, S.A. Kandil, H. El Khashab M.N.F. Nashed, Fuzzy Logic Implementation for Photovoltaic Maximum Power Tracking, IEEE 2000 International Electronics, Control and Instrumentation; 2000; pp. 735-740; vol. 1; Piscatawaym NJ, USA.

(Continued)

*Primary Examiner* — Matthew Nguyen
(74) *Attorney, Agent, or Firm* — Stolowitz Ford Cowger LLP

(57) ABSTRACT

A step wave power converter comprises multiple different bridge circuits configured to convert DC voltage inputs into AC voltage outputs. A controller is configured to estimate an average voltage output from the multiple different bridge circuits for controlling the current output from the multiple different bridge circuits. The number of bridge circuits needed to provide the estimated average output voltage is identified and the identified bridge circuits controlled during a next switching period to generate a combined inverter output voltage that corresponds with the estimated average output voltage.

In another embodiment, one or more transformers are associated with the different bridge circuits. Inductors are coupled between the bridge circuits and the primary windings of the associated transformers. The inductors filter the current output from the bridge circuits prior to feeding the current into the transformers.

20 Claims, 10 Drawing Sheets

U.S. PATENT DOCUMENTS

| | | | |
|---|---|---|---|
| 4,366,532 A | 12/1982 | Rosa et al. | |
| 4,367,196 A | 1/1983 | Wende et al. | |
| 4,375,662 A | 3/1983 | Baker | |
| 4,510,434 A | 4/1985 | Assbeck et al. | |
| 4,628,438 A | 12/1986 | Montague | |
| 4,678,983 A | 7/1987 | Rouzies | |
| 4,689,133 A | 8/1987 | McIlhenny | |
| 4,736,151 A | 4/1988 | Dishner | |
| 4,800,481 A | 1/1989 | Knaffl et al. | |
| 5,041,957 A | 8/1991 | Dhyanchand et al. | |
| 5,132,892 A | 7/1992 | Mizoguchi | |
| 5,229,652 A | 7/1993 | Hough | |
| 5,327,071 A | 7/1994 | Frederick et al. | |
| 5,334,463 A | 8/1994 | Tajima et al. | |
| 5,366,821 A | 11/1994 | Merritt et al. | |
| 5,373,433 A | 12/1994 | Thomas | |
| 5,376,912 A | 12/1994 | Casagrande | |
| 5,631,820 A | 5/1997 | Donnelly et al. | |
| 5,642,275 A * | 6/1997 | Peng et al. | 363/137 |
| 5,683,793 A | 11/1997 | Malhotra | |
| 5,696,439 A | 12/1997 | Presti et al. | |
| 5,714,874 A | 2/1998 | Bonnefoy | |
| 5,734,258 A | 3/1998 | Esser | |
| 5,757,633 A * | 5/1998 | Bowles | 363/71 |
| 5,763,113 A | 6/1998 | Meltser et al. | |
| 5,847,941 A | 12/1998 | Taguchi et al. | |
| 5,859,772 A | 1/1999 | Hilpert | |
| 5,896,281 A | 4/1999 | Bingley | |
| 5,898,282 A | 4/1999 | Drozdz et al. | |
| 5,933,339 A | 8/1999 | Duba et al. | |
| 5,986,909 A | 11/1999 | Hammond | |
| 6,015,634 A | 1/2000 | Bonville et al. | |
| 6,072,710 A | 6/2000 | Chang | |
| 6,096,449 A | 8/2000 | Fuglevand et al. | |
| 6,175,217 B1 | 1/2001 | DaPonte et al. | |
| 6,184,593 B1 | 2/2001 | Jungreis | |
| 6,188,199 B1 | 2/2001 | Beutler et al. | |
| 6,198,178 B1 | 3/2001 | Schienbein | |
| 6,225,794 B1 | 5/2001 | Criscione et al. | |
| 6,237,424 B1 | 5/2001 | Salmasi et al. | |
| 6,242,120 B1 | 6/2001 | Herron | |
| 6,243,277 B1 | 6/2001 | Sun et al. | |
| 6,255,008 B1 | 7/2001 | Iwase | |
| 6,275,018 B1 | 8/2001 | Telefus et al. | |
| 6,282,111 B1 | 8/2001 | Illingworth | |
| 6,304,068 B1 | 10/2001 | Hui et al. | |
| 6,324,042 B1 | 11/2001 | Andrews | |
| 6,340,851 B1 | 1/2002 | Rinaldi et al. | |
| 6,377,874 B1 | 4/2002 | Ykema | |
| 6,396,137 B1 | 5/2002 | Klughart | |
| 6,428,917 B1 | 8/2002 | Lacy et al. | |
| 6,522,955 B1 | 2/2003 | Colborn | |
| 6,556,461 B1 | 4/2003 | Khersonsky et al. | |
| 6,587,766 B2 | 7/2003 | Bruckner | |
| 6,608,404 B2 | 8/2003 | Schienbein | |
| 6,628,011 B2 | 9/2003 | Droppo | |
| 6,656,618 B2 | 12/2003 | Iwase | |
| 6,738,692 B2 | 5/2004 | Scheinbein | |
| 6,765,315 B2 | 7/2004 | Hammerstrom | |
| 6,867,987 B2 | 3/2005 | Cheng et al. | |
| 6,882,063 B2 | 4/2005 | Droppo | |
| 7,087,332 B2 | 8/2006 | Harris | |
| 7,110,272 B2 * | 9/2006 | Nojima | 363/56.03 |
| 2003/0214824 A1 * | 11/2003 | Corzine | 363/71 |
| 2004/0004403 A1 | 1/2004 | Schienbein et al. | |
| 2004/0095113 A1 | 5/2004 | Kernahan et al. | |

FOREIGN PATENT DOCUMENTS

| | | |
|---|---|---|
| CA | 2394761 | 6/2009 |
| DE | 19626447 | 3/1998 |
| DE | 19635606 | 3/1998 |
| DE | 19810468 | 11/2006 |
| EP | 390184 | 3/1990 |
| EP | 0614771 | 9/1994 |
| EP | 0667246 | 8/1995 |
| EP | 0703652 | 3/1996 |
| EP | 0756372 A1 | 1/1997 |
| EP | 0780750 A2 | 6/1997 |
| EP | 0874448 | 10/1998 |
| EP | 913918 | 5/1999 |
| EP | 0967086 | 12/1999 |
| EP | 1254505 | 11/2002 |
| EP | 1956002.8 | 6/2004 |
| GB | 2295508 | 5/1996 |
| GB | 2330254 | 4/1999 |
| JP | 02-101968 | 4/1990 |
| JP | 03-143268 | 6/1991 |
| JP | 05-23791 | 2/1993 |
| JP | 05-38154 | 2/1993 |
| JP | 07-67346 | 3/1995 |
| JP | 07-194118 | 7/1995 |
| JP | 07-222455 | 8/1995 |
| JP | 08-070581 | 3/1996 |
| JP | 10014133 | 1/1998 |
| JP | 10217603 | 8/1998 |
| JP | 11-89242 | 3/1999 |
| JP | 2001037101 | 9/2001 |
| WO | W09528285 | 10/1995 |
| WO | 99/41828 | 8/1999 |
| WO | 01/47095 | 6/2001 |
| WO | 02/11267 | 2/2002 |
| WO | 2009/044293 | 9/2009 |

OTHER PUBLICATIONS

Tarun Gupta, R.R., Bordeaux, R.M. Nelms and John Y. Hung, Implementation of a Fuzzy Controller for DC-DC Converters Using an Inexpensive 8-B Microcontroller, 1997 IEEE Transactions on Industrial Electronics, IEEE Oct. 1, 1997; pp. 661-668; vol. 44, No. 5; New York, USA.

Suttichai Premrudeepreechacharn and Tongrak Poapornsawan, "Fuzzy Logic Control of Predictive Current Control for Grid-Connected Single Phase Inverter," Conference record of the 28th IEEE Photovoltaic Specialists Conference; 2000, pp. 1715-1718; Anchorage, AK, USA.

Bor-Ren Lin, "Analysis of Fuzzy Control Method Applied to DC-DC Converter Control," Proceedings of the Annual Applied Power Electronics Conference and Exposition (APEC) San Diego; Mar. 7-11, 1993, pp. 22-28; New York, USA.

W.C. So, C.K. Tse and Y.S. Lee, "A Fuzzy Controller for DC-DC Converters," Power Electronics Specialists Conference PESC '94 Record, 25th Annual IEEE Taipei, Taiwan; Jun. 20-25, 1994; pp. 315-320; Taipei, Taiwan.

Claudio Manoel da Cunda Duarte and Ivo Barbi, "A New Family of ZVS-PWM Active-Clamping DC-to-DC Boost Converters: Analysis, Design, and Experimentation," IEEE Transactions on Power Electronics, vol. 12, No. 5 Sep. 1997, pp. 824-831.

D.G. Holmes, and T.A. Lipo, PMW of Cascaded Single-Phase H-Bridges; Pulse width Modulation of Power Converters: Principles and Practice; 2003; pp. 453-465; Wiley-IEEE Press.

J. Rodriquez, J. Lai and F.Z. Peng; Multilevel Inverters: A Survey of Topologies, Controls, and Applications; IEEE Transactions on Industrial Electronics; Aug. 2002, pp. 724-738; vol. 49, No. 4.

B.P. McGrath and D.G. Holmes; Multicarrier PWM Stragegies for Multilevel Inverters; IEEE Transactions on Industrial Electronics; Aug. 2002; pp. 858-867; vol. 49, No. 4.

J. Lai and F.Z. Peng; Multilevel Converters-A New Breed of Power Converters; IEEE Transactions on Industrial Applications; May/Jun. 1996; pp. 509-517; vol. 32, No. 3.

M. Calais, L.J. Borle, V.G. Agelidis: Analysis of Multicarrier PWM Methods for a Single-Phase Five Level Inverter; Power Electronics Specialists Conference; 2001; pp. 1351-1356; vol. 3; Vancouver B.C.

B.P. McGrath and D.G. Holmes; A Comparison of Multicarrier PWM Stragegies for Cascaded and Neutral Point Clamped Multilevel Inverters; Power Electronics Specialists Conference; 2000; pp. 674-679; vol. 2; Gallway.

B. Suh, G. Sinha, M.D. Manjrekar, and T.A. Lipo; Multilevel Power Conversion—an Overview of Topologies and Modulation Stragegies; Optimization of Electrical and Electronic Equipment (OPTIM): 1998; pp. A-11-A-24; vol. 2.

G. Carrara, S Gardella, M. Marchesoni, R. Salutari and G. Sciutto; A New Multilevel PWM Method: A Theoretical Analysis; IEEE Transactions on Power Electronics; Jul. 1992; pp. 497-505; vol. 7, No. 3.

H. Weiss; Low Voltage Commissioning of the System-Tie Converter Muldenstein/Nuernberg; Electronic Engineering Proceedings 2002 APEIE 2002 6th International Conference of Actual Problems of, Sep. 2002, pp. 273-278.

F. Caricchi et al.; Study of Bi-directional buck-boost converter topologies for application in electrical vehicle motor drives; Applied Power Electronics Conference and Exposition APEC '98 Conference Proceedings; Feb. 15, 1998; pp. 287-293; New York, NY, USA.

International Search Report for PCT/US00/26788; Date of mailing Jun. 26, 2001; ISA/EPO.

International Preliminary Search Report for PCT/US01/23681; Date of Completion Jul. 30, 2003; IPEA/US.

International Search Report for PCT/US01/23681; Date of mailing Jun. 28, 2008; ISA/EPO.

Boeck et al., "Bremen's 100-MW static frequency link," ABB Review, Sep. 10, 1996, pp. 4-17.

International Search Report for PCT/IB2008/003541; Date of mailing May 26, 2009.

Stolowitz Ford Cowger Listing of Related Cases; May 24, 2010.

Written Opinion for PCT/IB0803541; Mailing date May 26, 2009.

International Preliminary Search Report for PCT/US00/26788; Date of Completion of report Sep. 6, 2001; ISA/EPO.

EP Search Report for EP Application No. 0967086; Mailing date Oct. 28, 1998.

Stolowitz Ford Cowger, LLP, Listing of Related Cases, May 3, 2011.

* cited by examiner

FIG. 1

Note: TD= Sampling and computation time delay

PREDICTION SCHEME FOR STEP WAVE POWER CONVERTER AND INDUCTIVE INVERTER TOPOLOGY

This application claims priority to provisional patent application Ser. No. 60/941,939, filed Jun. 4, 2007 entitled: A NEW INVERTER TOPOLOGY and also claims priority to provisional patent application Ser. No. 60/943,818, filed Jun. 13, 2007 entitled: A ROBUST CURRENT-CONTROLLED PWM SCHEME FOR MULTILEVEL GRID-TIED INVERTERS which are both herein incorporated by reference in their entirety.

FIELD OF INVENTION

This application relates generally to power conversion.

BACKGROUND

Various step wave power converters exist for transforming a DC voltage into a step wave AC output. Step wave power converters use different transformers for each step of the step wave output. The primary windings of the different transformers are electrically coupled to the DC power source through bridge circuits. Gates in the bridge circuits control the flow of current through the primary windings to produce steps of the AC output from the secondary winding.

Unfortunately, step wave power converters are bulky and require multiple transformers for each step. Also, the total number of steps in the AC output directly correspond with the number of transformers used for producing the output. To get better resolution in a three-phase AC waveform output, even more transformers must be added to the power converter, further increasing its bulkiness.

A further drawback of certain power converters is that the step wave AC output is generally blocky as a result of the mere addition of positive and/or negative block steps to form the AC waveform output. Although blocky AC waveforms are acceptable for many applications, they are less than desirable for use in many modern electronic devices such as computers, televisions, etc., which perform better and last longer when power is supplied to them using a closely regulated AC power supply.

Current control is important to inverter power quality. The three major techniques used for regulating the current of a Voltage Source Inverter (VSI) are hysteresis, ramp comparison, and predictive current control. Hysteresis current controllers utilize hysteresis in comparing load currents to the references. A ramp comparison controller compares the error current signal with a triangular carrier waveform to generate inverter gating pulses. Predictive controllers calculate the inverter voltages required to force the measured currents to follow a reference current.

Predictive controllers offer the advantages of a more precise current control with minimal distortion, and also can be fully implemented on a digital platform. On the other hand predictive controllers require more computing resources and require a good knowledge of system parameters and can be sensitive to incorrect identification of load parameters. Some predictive current control schemes also are not designed for step-wave inverters.

DETAILED DESCRIPTION

Current-Controlled Pulse Width Modulation (PWM) Scheme for Multilevel Grid-Tied Inverters A novel current-control prediction scheme operates with multilevel grid-tied inverters. The prediction scheme can be used with any multilevel inverter topology which employs H-bridges where the outputs of multiple bridges are combined to obtain a multilevel output waveform. For instance, the prediction scheme can be used with a cascaded multilevel voltage-source inverter, and can also be used with inverters where the outputs of full-bridges, though isolated from each other, are combined through transformers. Specifically, the current-control prediction scheme can be implemented using the Step Wave Power Converter topologies described in U.S. Pat. No. 6,198,178, issued Mar. 6, 2001 which is herein incorporated by reference in its entirety.

Since-Phase Full-Bridge Voltage Source Inverter

Figure 1:
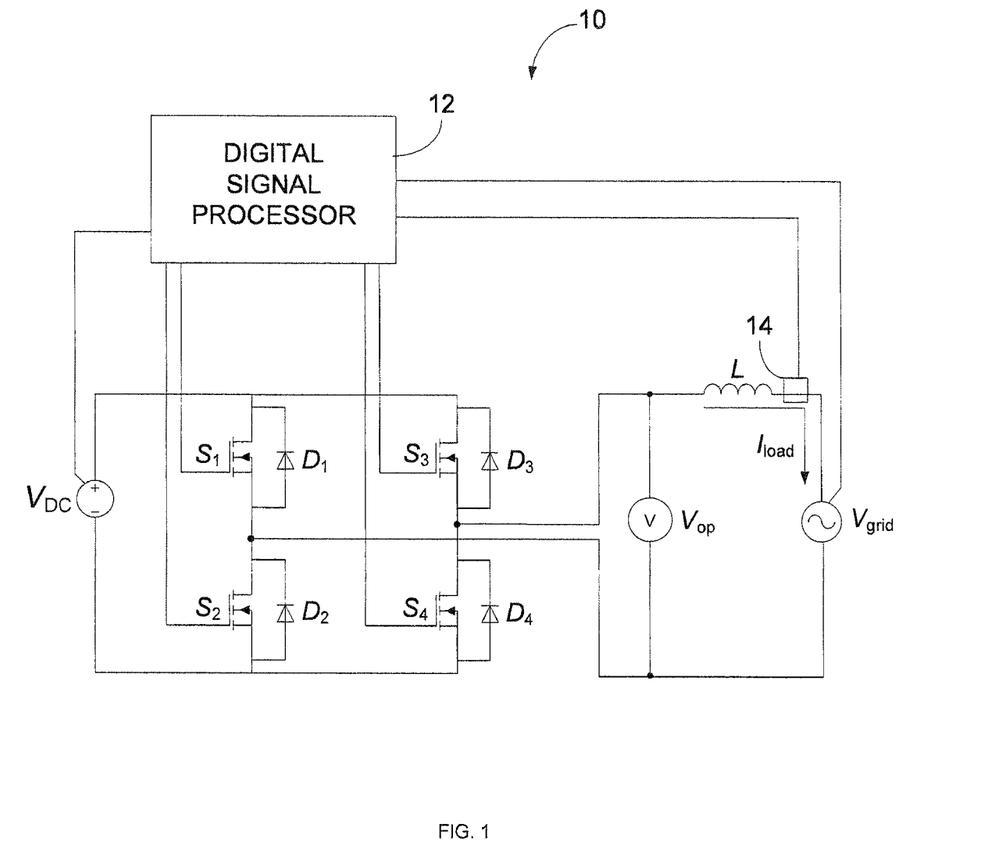
FIG. 1 is a schematic diagram of a single-phase grid connected full-bridge voltage source inverter.

FIG. 1 shows a single-phase full-bridge inverter 10. Two pairs of transistor switches $S_1/S_2$ and $S_3/S_4$ are each coupled in series across a Direct Current (DC) voltage source $V_{DC}$. Diodes $D_1$-$D_4$ are coupled across associated transistor switches $S_1$-$S_4$, respectively. The transistors $S_1$-$S_4$ are controlled by a Digital Signal Processor (DSP) 12 and are used to generate a full-bridge inverter 10 output voltage $V_{op}$. An inductor L is coupled in-between transistor pair $S_3/S_4$ and a first polarity of a power voltage grid (Vgrid). The second polarity of the power grid is coupled in-between transistor pair $S_1/S_2$. A load current $I_{load}$ passes through the inductor L from $V_{op}$ to $V_{grid}$.

The power transistors $S_1$-$S_4$ are switched on and off by the DSP 12 to generate an output voltage, $V_{op}$, equal to $+V_{DC}$, 0, or $-V_{DC}$. For example, turning on transistors $S_3$ and $S_2$ and turning off transistors $S_1$ and $S_4$ generate an output voltage $V_{op}=+V_{DC}$. Turning on transistors $S_1$ and $S_4$ and turning off transistors $S_2$ and $S_3$ generate an output voltage $V_{op}=-V_{DC}$. Turning on transistors $S_1$ and $S_3$ at the same time or turning on transistors $S_2$ and $S_4$ at the same time generates a bridge output voltage $V_{op}=0$. A zero output voltage $V_{op}=0$ is alternatively referred to as shunting the inverter 10.

From the simplified connection diagram shown in FIG. 1, the load current ($I_{load}$) of the inverter is determined by the following equation:

$$V_{op} = V_{grid} + L\frac{di_{load}}{dt} \quad (1)$$

Where $V_{grid}$ is the grid voltage, $V_{op}$ is the inverter output voltage, and L is the filter inductance. Assuming that the inverter 10 in FIG. 1 is operating with a constant switching frequency, the switching period is a constant value, $T_{period}$. In the switching period [n,n+1], equation (1) can be written in a discrete form as $$V_{op\_av}[n] = V_{grid\_av}[n] + L\frac{I_{load}[n+1] - I_{load}[n]}{T_{period}} \quad (2)$$

Where $V_{op\_av}[n]$ and $V_{grid\_av}[n]$ are the average inverter output voltage and average grid voltage over the switching period [n,n+1], respectively, and $I_{load}[n+1]$, $I_{load}[n]$ are the measured load currents at the sampling point of [n+1] and [n] respectively.

Figure 2:
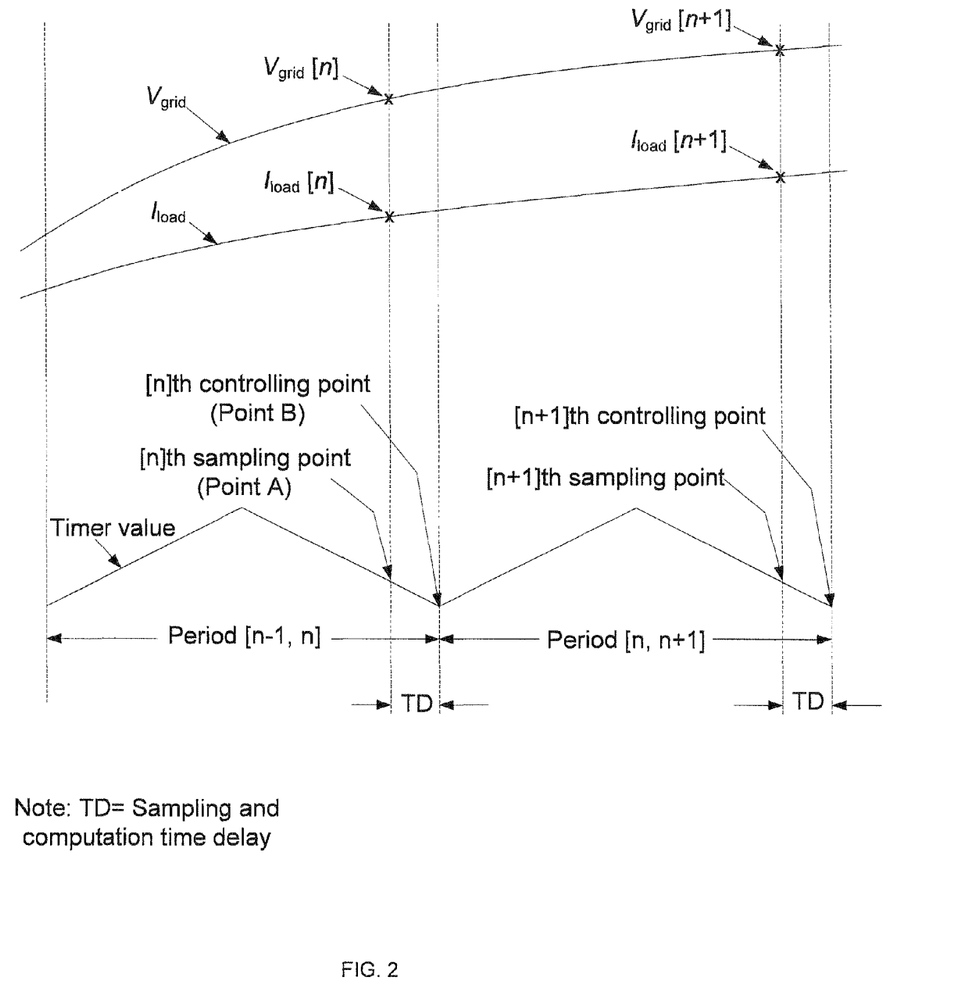
FIG. 2 is a diagram showing sampling points for a switching period.

The control principle of the improved predictive control methodology is illustrated in FIG. 2. A sampling point (Point A) is set just ahead of controlling point (Point B) by a period of the control delays. The delay between the sampling point and the controlling point is so short that it can be assumed that the sampled grid voltage and inverter current at sampling point [n] (Point A) are equal to the values at controlling point [n] (Point B). Thus, the measured values of current $I_{load}[n]$, and grid voltage $V_{grid\_av}[n]$, are available for the controller to predict the demanded output voltage of the inverter. The predictive control algorithm yields the following formula for the predicted average output voltage over the switching period [n,n+1]:

$$V_{op\_av}[n] = 1.5\,V_{grid}[n] - 0.5\,V_{grid}[n-1] + L\cdot\frac{I_{ref}[n+1] - I_{load}[n]}{T_{period}} \quad (3)$$

As mentioned above, one goal of the predictive control described in equation 1 is to calculate the inverter voltages required to force the measured current $I_{load}$ to follow the reference current $I_{ref}$. In other words, the DSP 12 uses the sampled values at time instants of [n-1] and [n], and tries to make the load current $I_{load}[n+1]$ equal to the reference current $I_{ref}[n+1]$ at the end of the switching period [n,n+1].

The duty ratio, D[n], for the bridge is calculated according to the following:

$$D[n] = \frac{V_{op\_av}[n]}{V_{DC}} \quad (4)$$

Step Wave Power Converter with Multi-Bride Inverter Operation

Figure 3:
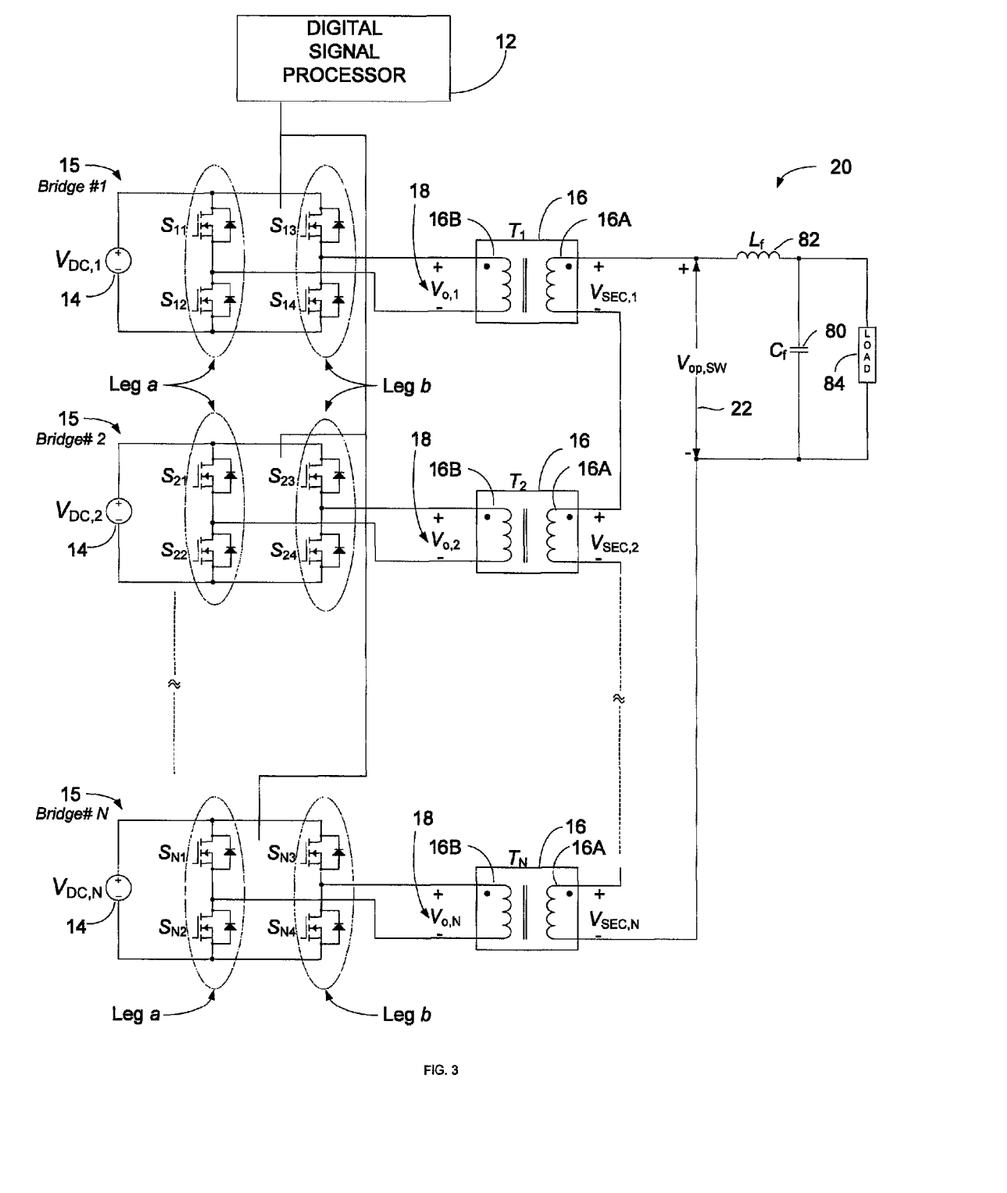
FIG. 3 is a schematic diagram of a single-phase grid connected step-wave inverter.

FIG. 3 shows a step wave inverter 20 that includes N full-bridges 15 (Bridge #1-Bridge #N) for a single-phase output voltage 22. Each full-bridge 15 is fed from a DC source 14. The switching of each bridge 15 is controlled independently of other bridges by the DSP 12 and the output of each Bridge #1-Bridge #N is fed into an associated transformer $T_1$-$T_N$, respectively. Each transformer 16 has an output voltage ratio of 1:R. The output voltage 22 of the inverter 20 is fed through an inductance filter 82 to a load 84. A capacitance filter 80 is coupled across load 84.

Figure 4:
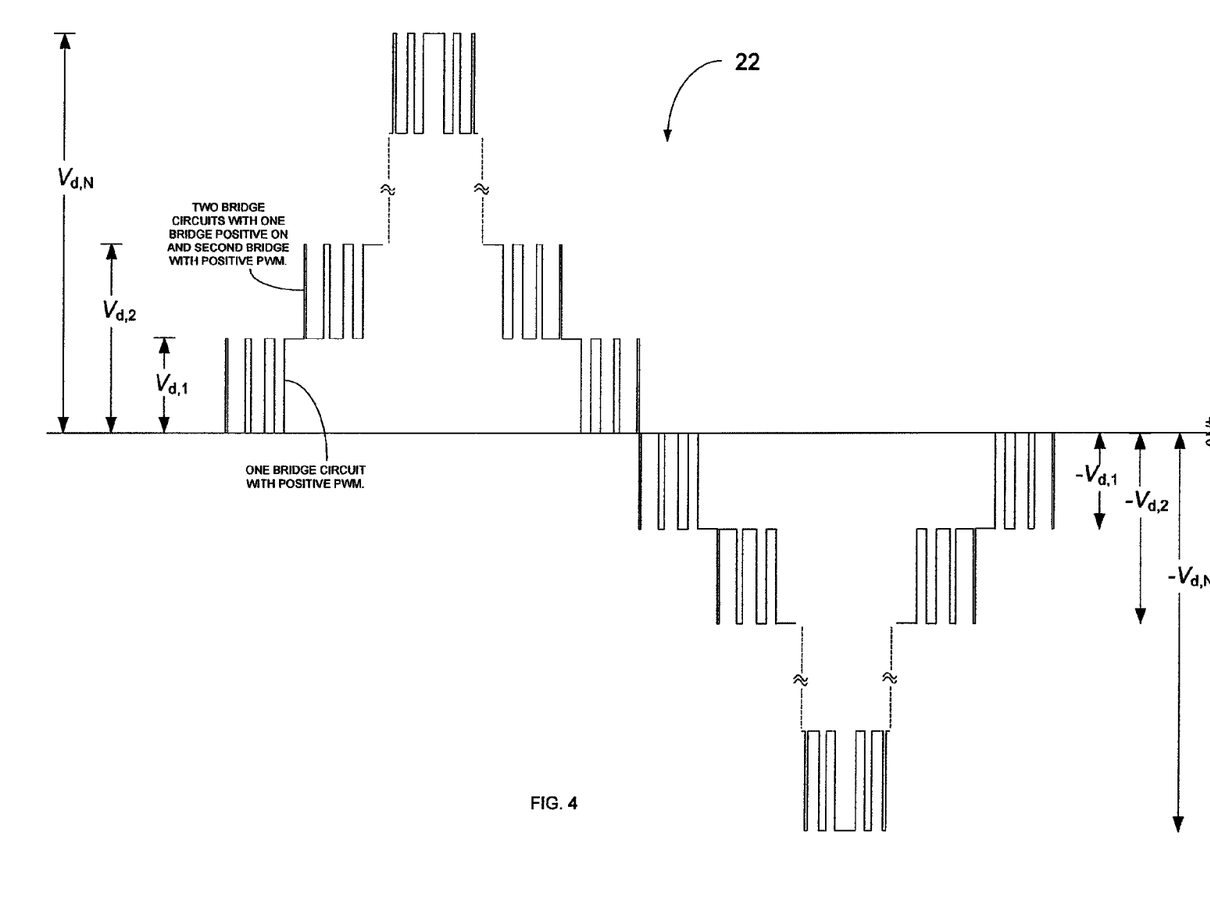
FIG. 4 is a schematic diagram of a voltage waveform generated by the step-wave inverter shown in FIG. 3.

Referring to FIGS. 3 and 4, the secondary windings 16A of the transformers $T_1$-$T_N$ are connected in series to yield a multilevel output voltage 22. For an inverter 20 with N bridges 15, (2N+1) output levels can be attained for the output voltage 22. The magnitude of the output voltage 22 at the secondary 16A of each transformer 16 in FIG. 3 is given by: ($R*V_{DC}$). As also shown in FIG. 4, the output voltage from one of the bridge circuits 15 is Pulse Width Modulated (PWM) for different proportions of a switching period duty cycle.

For example, the first positive output level $V_{d,1}$ may represent a single bridge circuit 15 pulse width modulating the associated DC input voltage 14 to form a first positive step of the output voltage 22. The second positive output level $V_{d,2}$ may represent two bridge circuits 15 each outputting positive $V_{DC}$ at outputs 18 to form a second positive step of the inverter output voltage 22. One of the two bridge circuits generates a positive output voltage $V_{DC}$ for the entire second step of voltage 22 and the second of the two bridge circuits 15 pulse width modulates $V_{DC}$. Similarly, the negative output level $-V_{d,1}$ may represent a single bridge circuit 15 negatively pulse width modulating $V_{DC}$. The second negative output level $-V_{d,2}$ may represent two bridge circuits 15 each negatively connecting $V_{DC}$ to the bridge outputs 18, where one bridge 15 outputs $-V_{DC}$ for the entire second negative step and the second bridge 15 pulse width modulates $-V_{DC}$.

The following equations give the output voltage levels as seen at the output 22 of the secondary windings 16A of transformers $T_1$-$T_N$ in FIG. 3. The negative values are generated by the bridges 15 reversing the output voltage provided by $V_{DC}$.

1 Bridge switching, N − 1 bridges in shunt state: $V_{d,1} = 1*R*V_{dc}$ (5)

2 Bridges switching, N − 2 bridges in shunt state: $V_{d,2} = 2*R*V_{dc}$

|

≈

|

N Bridges switching, 0 bridges in shunt state: $V_{d,N} = N*R*V_{dc}$

It should be understood that some inverter topologies may not use transformers $T_1$-$T_N$. For example, each of the bridge circuits 15 may connect their output voltages 18 directly to the load or $V_{grid}$ 84 as shown in FIG. 1. For a cascaded voltage-source inverter where no transformers 16 are used, the above equation can be modified by substituting R=1.

Figure 5A:
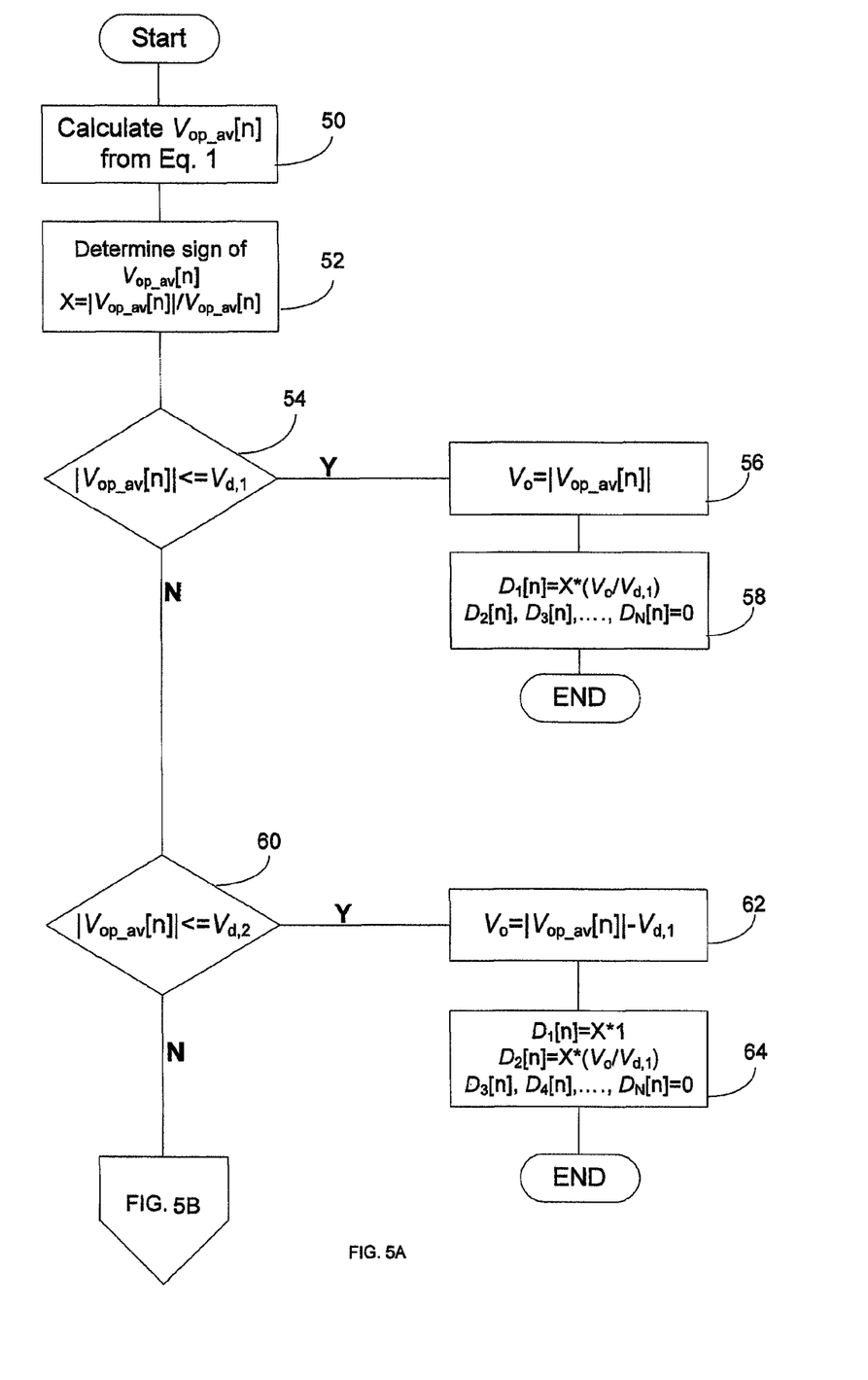
FIGS. 5A and 5B are a flow diagram showing how predictive current control is performed using the step-wave inverter shown in FIG. 3.
Figure 5B:
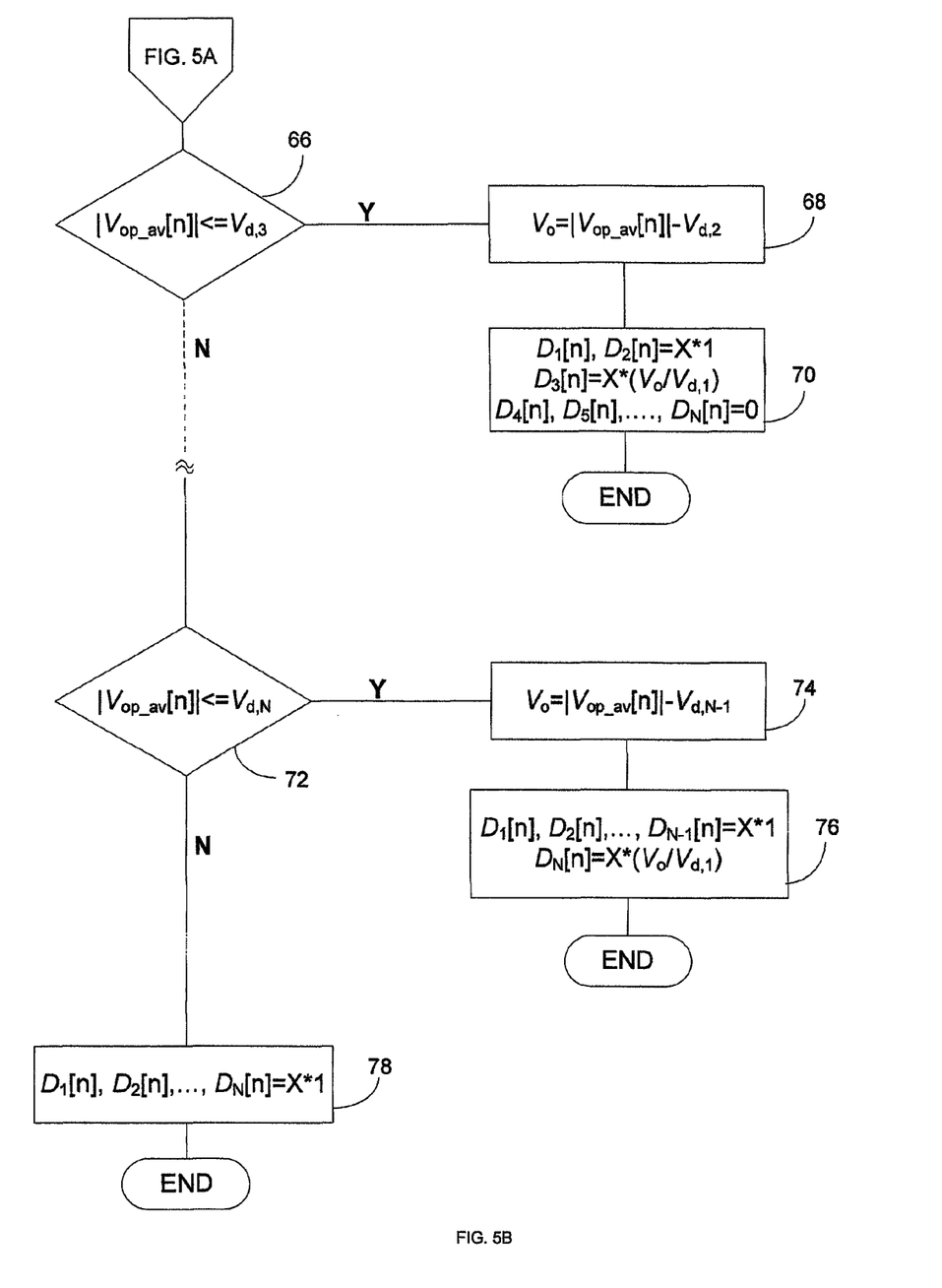

FIGS. 5A and 5B show how predictive current control is extended to the multilevel inverter configuration shown in FIG. 3 with N bridges, or (2N+1) levels. The flow diagram in FIGS. 5A and 5B also calculates duty ratios for different bridges #1-#N during inverter switching periods.

The DSP 12 in operation 50 predicts the average output voltage $V_{op\_av}[n]$ for a next switching period [n,n+1] using equation 3 above. The sign of the predicted output voltage $V_{op\_av}[n]$ is determined by the DSP 12 in operation 52. In operations 54, 60, 66, and 72, the magnitude of $V_{op\_av}[n]$ is compared with the different inverter output voltage levels described in equation 5. For example, the DSP 12 determines how many bridge circuits need to be activated in order to generate an output voltage 22 that is equal or just exceeds the predetermined estimated output voltage $V_{op\_av}[n]$. In other words, voltages from different bridge circuits 15 are incrementally combined together until $V_{op\_av}[n]$ is less than or equal to the combined output voltage 22.

The duty ratio is then calculated in operations 58, 64, 70, or 76 for one of the identified combination of bridge circuits 15 for a next switching period. Symbols $D_1, D_2 \ldots D_N$ refer to duty ratios for Bridge #1, Bridge #2 . . . Bridge #N, respectively.

For example, in operation 54, the DSP 12 compares the magnitude of $V_{op\_av}[n]$ with the voltage $V_{d,1}$ output from a single bridge circuit 15. If the predicted output voltage $V_{op\_av}[n]$ is less than or equal to $V_{d,1}$, then the duty ratio voltage is set to $V_0=|V_{op\_av}[n]|$ in operation 56. The duty ratio for a single bridge circuit 15 during a next switching period [n,n+1] is accordingly set in operation 58 to the ratio between $V_0$ and the output voltage from bridge #1 ($D_1[n]=X^*(V_0/V_{d,1})$). If $V_{op\_av}[n]$ is less than $V_{d,1}$, the remaining bridge circuits #2 . . . Bridge #N shunt their respective DC input voltages 14. In other words, the associated duty cycles $D_2[n]$, $D_3[n], \ldots D_N[n]$ for Bridge #2 . . . Bridge #N are respectively shunted to 0 V.

When the estimated output voltage $V_{op\_av}[n]$ is greater than $V_{d,1}$ in operation 54, $V_{op\_av}[n]$ is compared in operation 60 with the combined output voltage $V_{d,2}$ from two bridge circuits 15. If $V_{op\_av}[n]$ is less than or equal to $V_{d,2}$, then $V_o=|V_{op\_av}[n]|-V_{d,1}$ in operation 62. Since $V_{op\_av}[n]$ was greater than $V_{d,1}$ in operation 54, the duty cycle $D_1[n]$ for the bridge circuit #1 is set to $D_1[n]=X^*1$ in operation 64. In other words, the first bridge circuit #1 is turned on for the entire next switching period [n,n+1].

The duty cycle $D_2[n]$ for bridge circuit #2 is set by the DSP 12 as the ratio $D_2[n]=X^*(V_o/V_{d,1})$. Because $V_{op\_av}[n]$ is less than or equal to $V_{d,2}$, the duty cycles $D_3[n], D_4[n], \ldots, D_N[n]$ for Bridge #3, Bridge #4 . . . Bridge #N, respectively, are shunted for the next switching period [n,n+1] such that $D_3[n]$, $D_4[n], \ldots, D_N[n]=0$. According to the value of $V_{op\_av}[n]$, similar voltage comparisons may also be made in operations 66 and 72 for each switching period until a combined inverter output voltage is identified that exceeds $V_{op\_av}[n]$. Duty cycle calculations are similarly performed in operations 68/70, 74/76, or 78, respectively.

The operations performed in FIGS. 5A and 5B provide improved DSP current control for inverters coupled to a power grid. The operations can be used with any multilevel inverter topology that uses H-bridges and allows the outputs of the bridges to be added to obtain a multilevel output waveform. For instance, the operations in FIGS. 5A and 5B can be used with a cascaded multilevel voltage-source inverter, and also with inverters where the outputs of full-bridges, though isolated from each other, are combined through transformers.

The current control scheme can be implemented for a Step Wave inverter with four H-bridges using Texas Instruments TMS320F2407A DSP. Of course, any other type of programmable controller 12 can also be used. The total computation time required for performing the operations in FIG. 5 have been measured to be less than 11 μs. This computation time for multilevel current control is similar to a time delay of 10 μs measured for a single bridge predictive operation.

Inductive Filtering

A new inductive filtering topology provides an improvement to the class of inverters that use multiple H-bridges and magnetic components. The new topology and its advantages are explained in relation to a single-phase grid-tied step wave converter with N bridges as shown in FIG. 3. The waveforms associated with the transformers 16 in the step wave converter 20 of FIG. 3 are shown in FIGS. 6 and 7.

Figure 6:
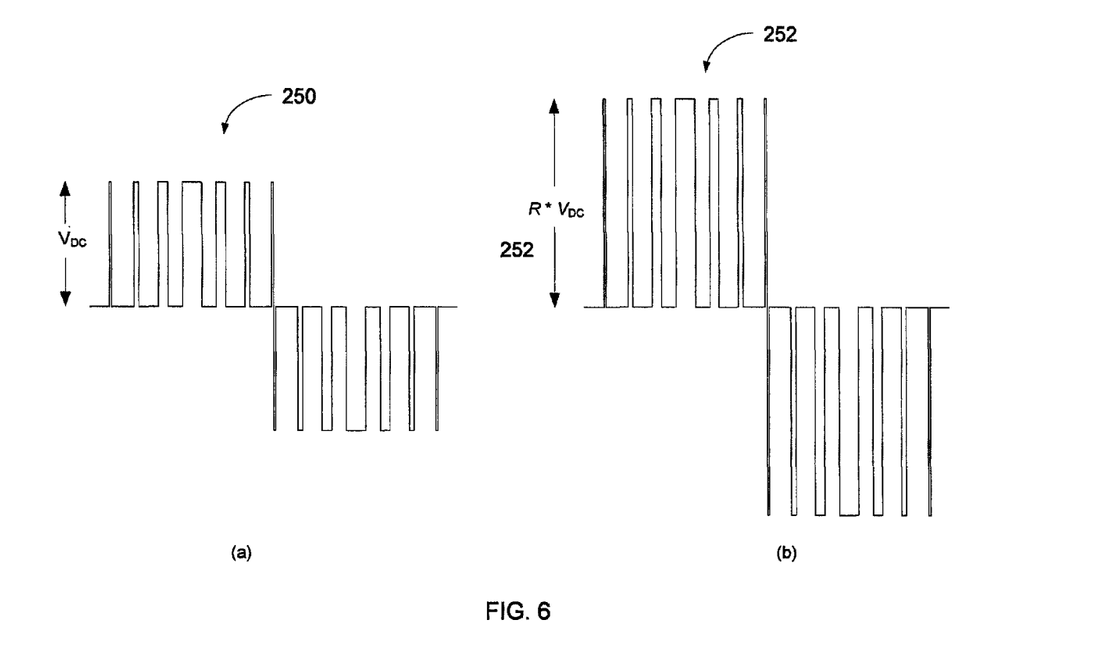
FIG. 6 shows voltage waveforms on a primary and secondary side of a transformer in a step wave converter.
Figure 7:
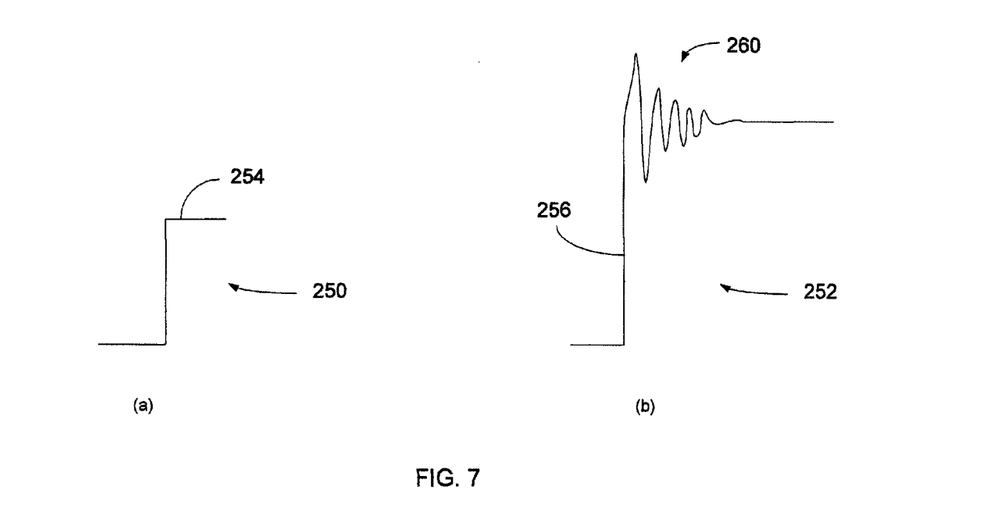
FIG. 7 shows one voltage pulse on a primary and secondary side of a transformer in a step wave converter.

The voltage waveform 250 in FIG. 6 is the voltage received at the primary 16B in FIG. 3 and the voltage waveform 252 in FIG. 6 is the voltage output from the secondary 16B for one of the transformers 16 tied to an associated H-bridge 15 in FIG. 3. The time scale of the AC grid is 16.6 milli-seconds for a 60 Hertz grid. It can be seen in FIG. 6 that for a DC source 14 of magnitude $V_{DC}$, the primary 16B of transform 16 experiences a pulse width modulated (PWM) waveform of magnitude $V_{DC}$, and the same waveform is imposed on the secondary 16A with the magnitude $V_{DC}*R$, where R is the primary to secondary turns ratio of transformer 16.

The PWM waveforms 250 and 252 in FIG. 6 present several challenges for the design and operation of both the transformers 16 and the power converter 20. First, the switching waveform is typically of the order of a few kilo-Hertz, which can create high acoustic noise in the transformer 16. Second, the PWM operation causes the converter 20 to produce in high electromagnetic noise. This is shown in FIG. 7 where the rising edge of a single pulse 254 and 256 are shown for the primary and secondary waveforms 250 and 252, respectively.

It can be seen that although the primary side voltage 254 is a clean step 254, the secondary side voltage step 256 experiences high frequency oscillations 260 in the order of few hundred kHz to a few MHz. This high frequency ringing 260 produces radio frequency noise that contributes to the Electro-Magnetic Interference (EMI) generated by the converter 20. It is very hard to control the generation of this EMI noise, and one of the only ways to reduce the EMI being injected into the grid is to attenuate it using EMI filters, which are costly and bulky. The PWM operation shown in FIG. 6 also tends to saturate the transformers 16.

With these issues in mind, a new power converter topology maintains the basic idea of multiple bridges and transformers but eliminates the problems described above. The power converter topology is described below for a grid-tied application, but the topology can also be used for stand-alone inverter applications.

Figure 8:
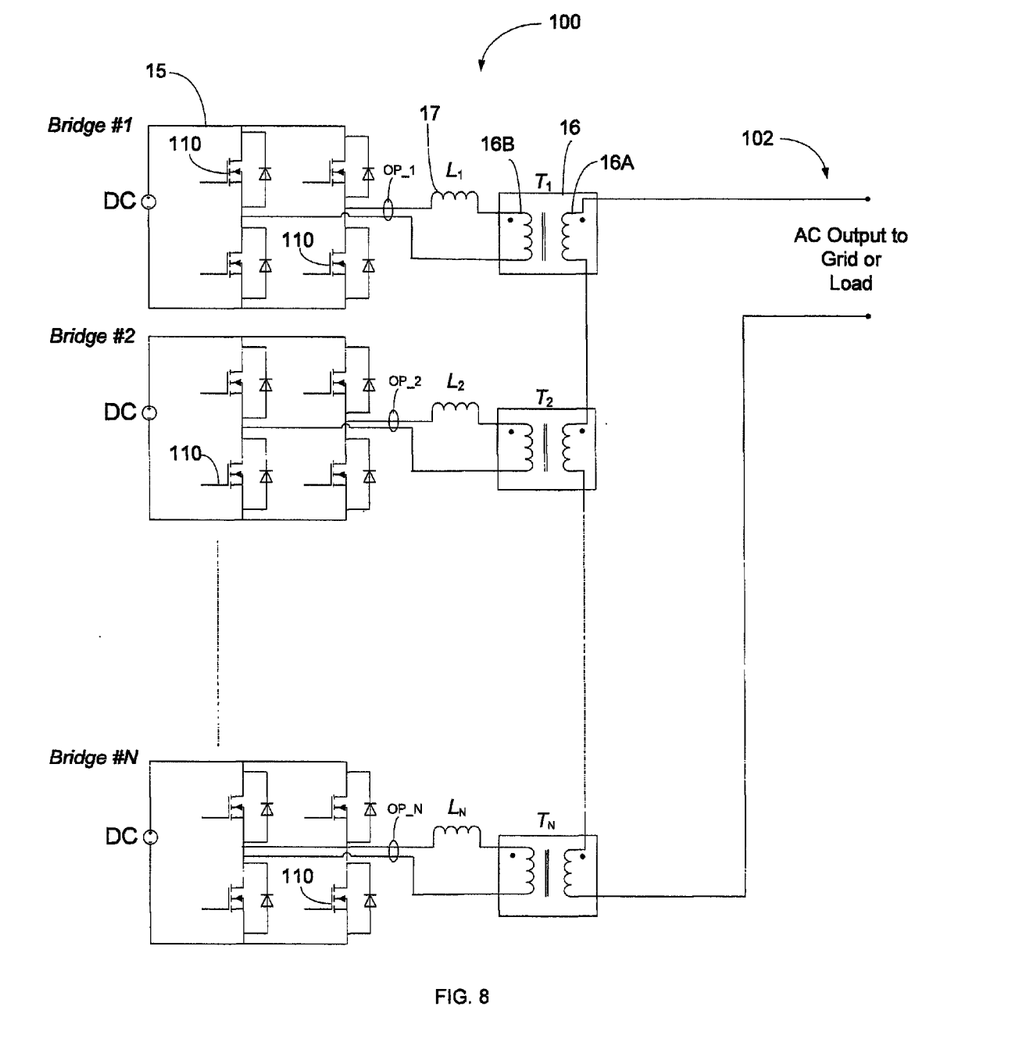
FIG. 8 is a schematic diagram of a single-phase grid connected step-wave inverter with primary side current filtering inductors.

FIG. 8 shows an inverter 100 that uses multiple full-bridges (or H-bridges) 15. The outputs OP_1-OP_N of Bridge #1-Bridge #N are coupled to associated transformers $T_1$-$T_N$ through associated inductors $L_1$-$L_N$, respectively. The secondary windings 16A of the transformers 16 are coupled together in series. In one example, the inductors 17 are each approximately between 0.25-1.0 Henry.

The DSP 12 previously shown in FIG. 3 is used to independently switch the different power transistors 110 in each Bridge #1-Bridge #N and allows use of pulse width modulation as described above in FIG. 6. In off-grid applications, where the inverter 100 supplies power to AC loads, Phase Shift Carrier PWM (PSCPWM) can be used. Also, for grid-tied operations, where the inverter 100 injects AC current into the utility grid, current-control schemes as described above in FIGS. 1-5 can also be used.

For a grid-tied application with N full-bridges 15 and N transformers 16, it can be seen that the grid voltage 102 will be divided equally among the N secondary windings 16A. Thus, for a Root Mean Square (RMS) grid voltage $V_{grid}$, each secondary winding 16A will be subjected to $V_{grid}/N$, and each primary voltage will be $V_{grid}/(N*R)$.

The winding voltages are sinusoidal compared to the PWM waveform for the step wave converter shown in FIGS. 6 and 7. Thus the topology in FIG. 8 eliminates the drawbacks of transformer operation under PWM by imposing sinusoidal voltages across the windings 16A and 16B. In other words, the acoustic noise of the transformers 16 in FIG. 8 is significantly reduced and the EMI noise generated by the ringing is also eliminated. The sinusoidal operation also means that the transformers $T_1$-$T_N$ can be designed in a conventional manner and the special considerations of PWM operation need not be taken into account.

Figure 9:
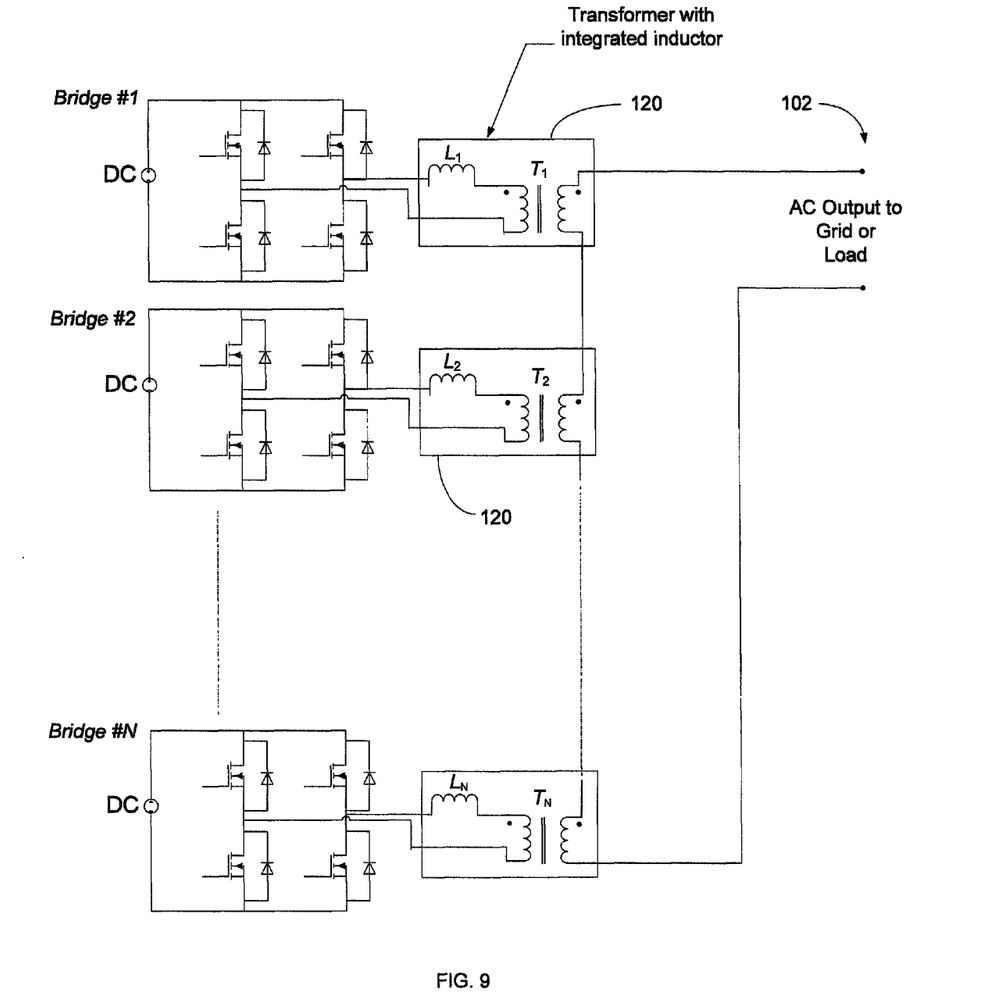
FIG. 9 shows another embodiment where the primary side inductors are integrated with associated transformers.

FIG. 9 shows how the inductors $L_1$-$L_N$ are integrated with the transformers $T_1$-$T_N$, respectively, in the same assemblies 120. Integration of magnetic components can be achieved by incorporating the required filter inductance L into the magnetic core structure of the transformers T. This scheme results in N magnetic components, where each magnetic component consists of a transformer T with integrated inductance L. The assemblies 120 may each be manufactured to include the inductance L and the associated transformer T in a same enclosure or assembly.

Figure 10:
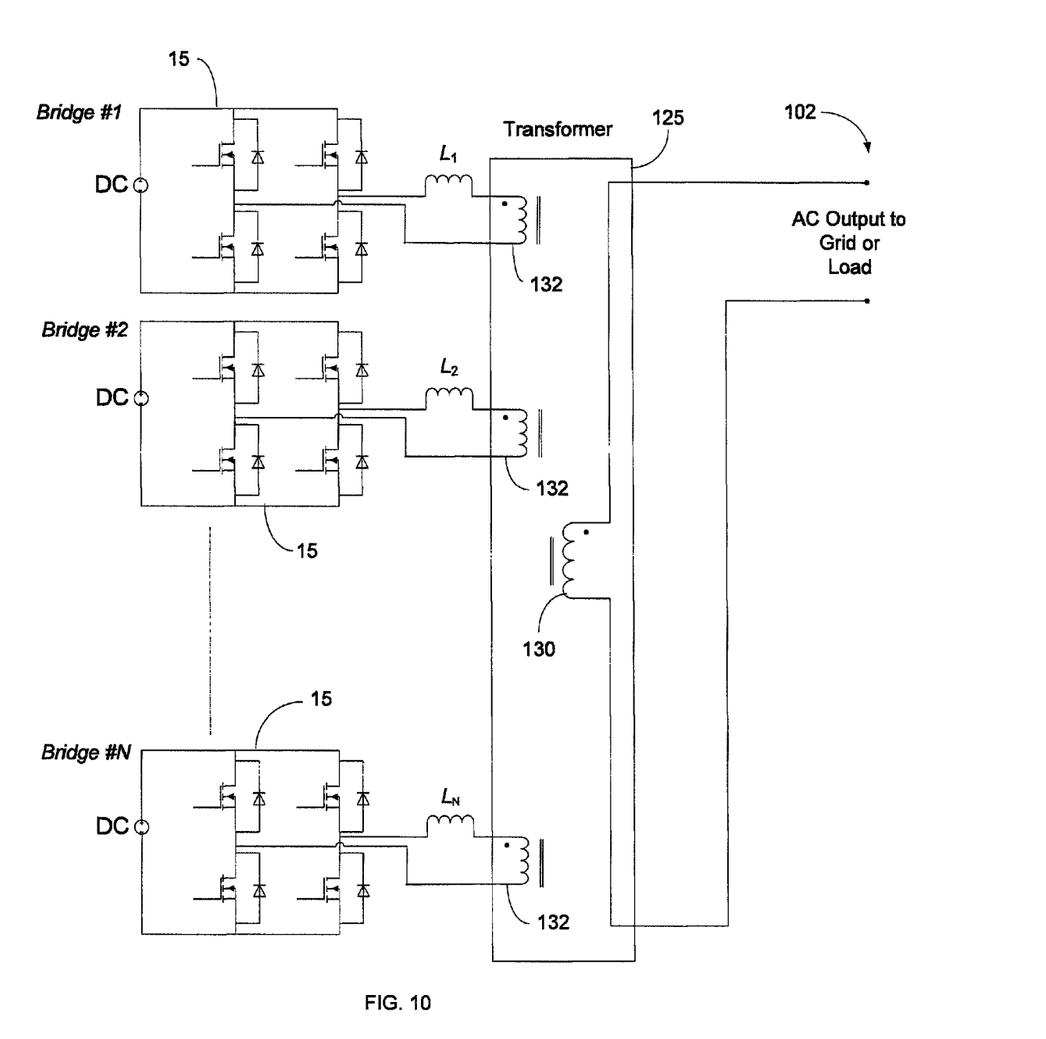
FIG. 10 shows another embodiment of the step-wave inverter that uses a single transformer and multiple primary side inductors.

FIG. 10 shows another practical way of implementing the proposed topology by using a single transformer 125 and multiple inductors $L_1$-$L_N$. Under this scheme, the construction of transformer 125 consists of one secondary winding 130 and multiple primary windings 132 each associated with one of the bridge circuits 15. The topology shown in FIG. 10 results in N inductors $L_1$-$L_N$ and one transformer 125. The single transformer 125 configuration can be constructed to integrate the desired inductances $L_1$-$L_N$ and results in only one magnetic component in the power converter.

Using the inductors $L_1$-$L_N$ on the primaries 132 effectively de-couple the different bridges #1-#N allowing each of the bridges 15 to operate independently even when connected to the same transformer 125. As described above, the location of inductors $L_1$-$L_N$ also allow the secondary 130 of transformer 125 to be connected directly to the grid 102.

The Step Wave Power Converters (SWPC) described above have a wide range of uses beyond converting power from a single DC source to AC power. One such use includes consolidation, integration and supervisory control of multiple power sources through a single SWPC while isolating each source so that each can operate at optimum efficiency. The power sources connected to the SWPC can include diesel or gas generators, wind turbines, solar photovoltaic (PV) cell arrays, hydro-electric generators, batteries, gas turbine generators, fuel cells, etc.

Yet another use is in backup power supply systems, including integration, isolation, and management of the power sources that comprise the backup power supply system. Still another use is managing the power for power generators installed in the distributed generation mode. Another use is end of grid and in line voltage and power quality regulation. Further uses include standard 60 Hz or customized frequency regulation; the ability to feed reactive power to a grid or an off-grid load on demand; and the provision of a programmable microprocessor controller that is customized and optimized, as required, for each application.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears.

Only those parts of the various units are shown and described which are necessary to convey an understanding of the examples to those skilled in the art. Those parts and elements not shown are conventional and known in the art.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. Claim is made to all modifications and variation coming within the spirit and scope of the following claims.

The invention claimed is:

1. A step wave power converter comprising:
multiple different bridge circuits configured to convert DC voltage inputs into AC voltage outputs; and
a processor configured to:
estimate an average voltage output from the multiple different bridge circuits for controlling current output from the multiple different bridge circuits;
identifying how many of the bridge circuits are needed to provide the estimated average output voltage; and
controlling the identified bridge circuits during the next switching period to generate a combined inverter output voltage that corresponds with the estimated average output voltage, wherein the average output voltage is estimated according to:

$$V_{op\_av}[n] = 1.5\, V_{grid}[n] - 0.5\, V_{grid}[n-1] + L \cdot \frac{I_{ref}[n+1] - I_{load}[n]}{T_{period}}$$

where:
$T_{period}$ is a switching period [n,n+1],
$V_{op\_av}[n]$ is the average voltage output over the switching period [n,n+1],
$V_{grid\_av}[n]$ is an average grid voltage over the switching period [n,n+1],
$I_{load}[n]$ is a measured load current at a sampling point of [n],
$I_{ref}[n+1]$ is a reference current at a sampling point of [n+1], and
L is a filter inductance.

2. The step wave power converter according to claim 1, wherein the processor is further configured to:
identify a combined output voltage for the bridge circuits that is equal to or just exceeds the estimated output voltage;
determine a duty ratio for the next switching period proportional to how much the combined output voltage exceeds the estimated average output voltage, if any; and
turn on all but one of the identified bridge circuits for the entire next switching period and turning on a remaining one of the identified bridge circuits during the next switching period according to the identified duty ratio.

3. The step wave power converter according to claim 2, wherein the remaining one of the bridge circuits is pulse width modulated during the next switching period according to the identified duty ratio.

4. The step wave power converter according to claim 1, wherein the processor is further configured to shunt any remaining non-identified bridge circuits during the next switching period.

5. The step wave power converter according to claim 1, further comprising one or more transformers coupled between the multiple different bridge circuits and a grid voltage.

6. The step wave power converter according to claim 5, further comprising current filtering inductors coupled between the bridge circuits and associated primary windings of the one or more transformers.

7. The step wave power converter according to claim 1, wherein the estimated average output voltage is calculated to force a measured load current to follow a reference current.

8. The step wave power converter according to claim 1, wherein each of the bridge circuits comprises two gate pairs each arranged in series and each coupled across the DC input voltage, a first end of a primary winding for an associated transformer for each one of the bridge circuits coupled between a first one of the two gate pairs and a second end of the primary winding coupled between a second one of the two gate pairs.

9. A method comprising:
using multiple different bridge circuits in a power inverter to convert one or more DC voltage sources into an AC voltage for coupling to a power grid;
predicting an output voltage for the inverter for a next switching period according to a measured power grid voltage and measured inverter load current for a switching period;
identifying what bridge circuits are needed to substantially produce the predicted output voltage for a next switching period; and
activating the identified bridge circuits to substantially output the predicted output voltage while shunting outputs for any non-identified bridge circuits.

10. The method according to claim 9 further comprising calculating the predicted output voltage so that a value of that the inverter load current at the end of the next switching period is substantially equal to a reference current value at the end of the switching period.

11. The method according to claim 9 further comprising:
repeatedly predicting the output voltage for multiple switching periods;
repeatedly identifying which bridge circuits are needed to substantially produce the repeatedly predicted output voltage for each of the switching periods; and
activating the repeatedly identified number of bridge circuits for each of the switching periods to substantially generate the repeatedly predicted output voltage.

12. The method according to claim 9 further comprising:
calculating a combined output voltage for the identified bridge circuits;
calculating a duty ratio according to how much the combined output voltage exceeds the predicted output voltage, if any; and
turning on one of the identified bridge circuits during the next switching period proportionally to the calculated duty ratio.

13. The method according to claim 12 including generating a pulse width modulated output voltage from the identified one of the bridge circuits during the next switching period while generating a constant positive or negative output voltage for the other identified bridge circuits for the next switching period.

14. The method according to claim 9 wherein the predicted output voltage is calculated according to:

$$V_{op\_av}[n] = 1.5\, V_{grid}[n] - 0.5\, V_{grid}[n-1] + L \cdot \frac{I_{ref}[n+1] - I_{load}[n]}{T_{period}}$$

where:
$T_{period}$ is a switching period [n,n+1],
$V_{op\_av}[n]$ is an average power inverter output voltage over the switching period [n,n+1],
$V_{grid\_av}[n]$ is an average power grid voltage over the switching period [n,n+1],
$I_{load}[n]$ is the measured inverter load current at a sampling point of [n],
$I_{ref}[n+1]$ is a reference current at a sampling point of [n+1], and
L is a filter inductance.

15. The method according to claim 9 further comprising filtering current output from the individual bridge circuits prior to combining together the output voltages from the individual bridge circuits.

16. The method according to claim 15 wherein one or more transformers include different primary windings coupled to different bridge circuits and one or more secondary windings coupled to the power grid, and further comprising filtering current output from the bridge circuits prior to feeding the output voltages into the associated primary windings of the one or more transformers.

17. An apparatus comprising:
one or more bridge circuits in a power inverter configured to convert one or more DC voltage sources into an AC voltage for coupling to a power grid;
logic circuitry configured to:
predict an output voltage for the inverter for a next switching period according to a measured power grid voltage and a measured inverter load current for a switching period;
identify what bridge circuits are needed to substantially produce the predicted output voltage for a next switching period; and
activate the identified bridge circuits to substantially output the predicted output voltage.

18. The apparatus according to claim 17 wherein the logic circuitry is further configured to calculate the predicted output voltage so that that a value for the inverter load current at the end of the next switching period is substantially equal to a reference current value.

19. The apparatus of claim 17 further comprising:
calculating a duty ratio according to an average of the predicted output voltage and an output voltage for one of the bridge circuits; and
turning on one of the bridge circuits during the next switching period proportionally to the calculated duty ratio.

20. The apparatus according to claim 17 wherein the predicted output voltage is calculated according to:

$$V_{op\_av}[n] = 1.5\, V_{grid}[n] - $$
$$0.5\, V_{grid}[n-1] + L \cdot \frac{I_{ref}[n+1] - I_{load}[n]}{T_{period}}$$

where:
$T_{period}$ is the switching period [n,n+1],
$V_{op\_av}[n]$ is an average predicted output voltage of the inverter over the switching period [n,n+1],
$V_{grid\_av}[n]$ is an average grid voltage over the switching period [n,n+1],
$I_{load}[n]$ is the measured inverter load current at a sampling point of [n],
$I_{ref}[n+1]$ is a reference current at a sampling point of [n+1], and
L is a filter inductance.

* * * * *